(12) United States Patent
Grogg et al.

(10) Patent No.: US 6,699,151 B2
(45) Date of Patent: *Mar. 2, 2004

(54) SOLENOID VALVE CONTROLLED ALL-WHEEL DRIVE HYDRAULIC COUPLING ASSEMBLY

(75) Inventors: John A. Grogg, LaOtto, IN (US); Wayne L. Borgen, Fort Wayne, IN (US); Martin Kaplan, Avon, CT (US)

(73) Assignee: Torque-Traction Technologies, Inc., Maumee, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/106,226

(22) Filed: Mar. 27, 2002

(65) Prior Publication Data

US 2003/0186772 A1 Oct. 2, 2003

(51) Int. Cl.[7] .................. F16H 48/26; B60K 17/354
(52) U.S. Cl. .................. 475/88; 475/150; 180/247
(58) Field of Search ............... 475/84, 86, 88, 475/150; 192/103 F; 180/247

(56) References Cited

U.S. PATENT DOCUMENTS

| | | | |
|---|---|---|---|
| 5,119,900 A | * | 6/1992 | Watanabe et al. ........... 180/247 |
| 5,297,994 A | | 3/1994 | Suzuki et al. |
| 5,827,145 A | | 10/1998 | Okcuoglu |
| 5,964,126 A | | 10/1999 | Okcuoglu |
| 5,984,259 A | * | 11/1999 | Najmolhoda et al. .......... 251/50 |
| 6,015,361 A | * | 1/2000 | Yamazaki et al. ........... 180/247 |
| 6,095,276 A | * | 8/2000 | Kuroda et al. .............. 180/247 |
| 6,095,939 A | | 8/2000 | Burns et al. |
| 6,176,800 B1 | | 1/2001 | Shaffer et al. |
| 6,183,387 B1 | | 2/2001 | Yoshioka |
| 6,186,258 B1 | | 2/2001 | Deutschel et al. |

* cited by examiner

Primary Examiner—Rodney H. Bonck
Assistant Examiner—Dennis Abdelnour
(74) Attorney, Agent, or Firm—Liniak, Berenato & White

(57) ABSTRACT

A hydraulic coupling assembly is provided for an auxiliary drive axle of an all wheel drive motor vehicle. The hydraulic coupling assembly comprises a rotatable casing, first and second output shafts axially outwardly extending from said casing, at least one hydraulically operated, selectively engageable friction clutch assembly for operatively coupling the casing to at least one of the output shafts, and at least one hydraulic clutch actuator. The hydraulic actuator includes a hydraulic pump located within the casing and adapted to generate a hydraulic pressure to frictionally load the friction clutch assembly, and a variable pressure relief valve assembly fluidly communicating with the hydraulic pump to selectively control the hydraulic pressure generated by the pump. The variable pressure relief valve assembly includes an electro-magnetic actuator selectively for varying a release pressure of the pressure relief valve assembly based on a magnitude of an electric current applied thereto.

27 Claims, 8 Drawing Sheets

SOLENOID VALVE CONTROLLED ALL-WHEEL DRIVE HYDRAULIC COUPLING ASSEMBLY

BACKGROUND OF THE INVENTION

1. Field of the Invention

The present invention relates to hydraulic coupling assemblies for motor vehicles, and more particularly to an all-wheel drive hydraulic coupling assembly having an electronically controlled hydraulic actuator including an electro-magnet actuated variable pressure relief valve for selectively activating an auxiliary drive axle of the all-wheel drive motor vehicle.

2. Description of the Prior Art

Many modern vehicles employ four-wheel drive systems. These systems have been marketed in two forms. Systems generally termed four-wheel drive (4WD) have a transfer case, which is controlled by the operator to select two wheel or four-wheel drive. If the operator selects the four-wheel drive condition, the vehicle drives all four wheels continuously. Some of these systems have employed overrunning clutches at two of the wheel to alleviate some of the disadvantages of 4WD which result from tire pressure differential and cornering to name a few.

All wheel drive (AWD) systems also provide the benefits of a four-wheel drive vehicle and do not require the operator to intentionally select this condition. These systems often employ a viscous clutch in the center differential to transfer torque to the drive wheels that are not sensed as slipping. In tight cornering situations and during towing, these AWD systems present a disadvantage. In cornering situations, noise and vibration can result from the AWD system being engaged. While this is not detrimental to the powertrain during short durations, it can be disconcerting to the operator.

Hydraulic couplings are used in various vehicular drivetrain applications to limit slip and transfer drive torque between a pair of rotary members. In all-wheel drive applications, hydraulic couplings are used to automatically control the drive torque transferred from a driven member to a non-driven member in response to speed differentiation therebetween. In limited slip applications, couplings are used in association with a differential to automatically limit slip and bias the torque distribution between a pair of rotary members.

Such hydraulic couplings conventionally use a frictional clutch between the rotary members. The frictional clutch may be selectively actuated by various hydraulic actuator assemblies, which are constructed of elements disposed inside the differential casing. The hydraulic actuator assemblies internal to the differential case often include displacement pumps disposed inside the differential casing and actuated in response to a relative rotation between the differential case and the output shaft. The displacement pumps are usually in the form of internal gear pumps, such as gerotor pumps adapted to convert rotational work to hydraulic work. In the internal gear pumps, an inner gear having outwardly directed teeth cooperates with an external gear having inwardly directed teeth so that fluid chambers therebetween increase and decrease in volume as the inner and outer gears rotate in a housing. By connecting the inlet and outlet of the device to the proper location along the sides of the gear set, the variable displacement chambers receive and discharge hydraulic fluid so that the device can function as a pump or motor. A shaft or other mechanical device can be connected to either the inner or outer gear depending upon the type of device. The hydraulic actuator assemblies further include a hydraulic piston member for frictionally loading the friction clutch.

While known hydraulic couplings, including but not limited to those discussed above, have proven to be acceptable for various vehicular driveline applications, such devices are nevertheless susceptible to improvements that may enhance their performance and cost. With this in mind, a need exists to develop improved hydraulic couplings and driveline apparatuses that advance the art.

Moreover, there is a problem with the current hydraulic coupling in that they do not have a simple on/off capability, which is separate and distinct from the hydraulic pressure supply/control circuit actuating the clutch assemblies. Therefore, it is the intent of this invention to overcome these shortcomings by providing an external control of the hydraulic pressure generated within a hydraulically actuated limited slip coupling in which the limited slip clutch can either be turned on or off, or set at any intermediate condition by controlling the maximum system hydraulic pressure limit.

SUMMARY OF THE INVENTION

The present invention provides an improved hydraulic coupling assembly for all wheel drive (AWD) motor vehicles, having an electronically controlled hydraulic actuator including an electro-magnet actuated variable pressure relief valve assembly for selectively activating an auxiliary drive axle of the all-wheel drive motor vehicle and providing an infinitely variable torque distribution between main and auxiliary axles of the AWD motor vehicle.

The hydraulic coupling assembly in accordance with the present invention comprises a rotatable casing driven by an internal combustion engine, first and second output shafts axially outwardly extending from the casing, at least one hydraulically operated, selectively engageable friction clutch assembly for operatively coupling the casing to at least one of the output shafts, and at least one hydraulic clutch actuator. The hydraulic actuator includes a hydraulic pump located within the casing and adapted to generate a hydraulic pressure to frictionally load the friction clutch assembly, and a variable pressure relief valve assembly fluidly communicating with the hydraulic pump to selectively control the hydraulic pressure generated by the pump. The variable pressure relief valve assembly includes a valve closure member, a valve seat complementary to said valve closure member, and an electro-magnetic actuator selectively for varying a release pressure of the pressure relief valve assembly based on a magnitude of an electric current applied to the electro-magnetic actuator.

The electro-magnetic actuator includes a coil winding supported by the casing and an armature radially spaced from said coil winding and axially movable relative thereto in response to a magnetic flux generated by said coil winding when said electrical current is supplied thereto, said armature engages said valve closure member and urges thereof against said valve seat with an axial force determined by said magnitude of said electric current for selectively setting up said release pressure of said valve closure member.

In accordance with the first exemplary embodiment of the present invention, the hydraulic coupling assembly includes two opposite hydraulically actuated friction clutch assemblies for operatively connecting the casing and the corresponding output axle shafts. Preferably, the friction clutch assemblies are substantially identical, and each includes a friction clutch pack that selectively frictionally couples the corresponding rear output axle shaft to the casing.

Each of the clutch assemblies is selectively actuated by a corresponding hydraulic clutch actuator. Preferably, the hydraulic clutch actuator are substantially identical, and each includes a speed sensitive positive displacement hydraulic pump providing a pressurized hydraulic fluid, a piston assembly for axially loading the clutch pack, and a variable pressure relief valve assembly for selectively controlling a discharge pressure of the pump and, subsequently, the clutch pack. The variable pressure relief valve assembly has a pressure relief valve and a solenoid actuator for selectively setting a maximum hydraulic pressure attainable within the pressure chamber between a maximum release pressure when the friction clutch pack is in the fully "ON" condition, and a minimum release pressure when the friction clutch pack is in the fully "OFF" condition.

Each of the variable pressure relief valve assembly is operated by an electro-magnetic (preferably, solenoid) actuator electronically controlled by a coupling control module (CCM) based on one or more vehicle parameters as control inputs, such as a vehicle speed, a wheel speed difference, vehicle yaw rate, a vehicle lateral acceleration, a steering angle, an engine throttle position, a brake application, an ice detection, a moisture detection, a vehicle driveline configuration, a vehicle yaw stability control system and an anti-lock brake system/traction control system (ABS/TCS). When energized, the solenoid-operated valve assembly is capable of modulating a pump discharge pressure in a variable range from a minimum pressure to a maximum pressure, thereby selectively and variably controlling a drive torque applied to the output axle shafts in a range from a minimum torque value to a maximum torque value.

The variable pressure relief valve assembly includes a valve closure member, a valve seat complementary to the valve closure member, and an electro-magnetic actuator for engaging the valve closure member and urging thereof against the valve seat with an axial force determined by a magnitude of an electric current supplied to the electro-magnetic actuator so as to selectively vary a release pressure of the pressure relief valve assembly based on the magnitude of the electric current.

In accordance with the second exemplary embodiment of the present invention, the hydraulic coupling assembly includes two opposite, substantially identical hydraulically actuated friction clutch assemblies for operatively connecting the casing and the corresponding output axle shafts. A single hydraulic clutch actuator selectively actuates both of the clutch assemblies. The hydraulic clutch actuator comprises a hydraulic pump for generating a hydraulic pressure, a piston assembly disposed within the differential case between the pump and the clutch pack and defining a pressure chamber, and a variable pressure relief valve assembly to selectively control said limited slip assembly. The variable pressure relief valve assembly has a pressure relief valve and a solenoid actuator for selectively setting a maximum hydraulic pressure attainable within the pressure chamber between a maximum release pressure when the friction clutch pack is in the fully "ON" condition, and a minimum release pressure when the friction clutch pack is in the fully "OFF" condition. When energized, the solenoid-operated valve assembly is capable of modulating a pump discharge pressure in a variable range from a minimum pressure to a maximum pressure, thereby selectively and variably controlling a drive torque applied to the output axle shafts in a range from a minimum torque value to a maximum torque value.

In accordance with the third exemplary embodiment of the present invention, the hydraulic coupling assembly includes a hydraulically actuated friction clutch assembly for operatively connecting the casing and a differential assembly disposed within the casing. The friction clutch assembly is selectively actuated by a hydraulic clutch actuator. The hydraulic clutch actuator comprises a hydraulic pump for generating a hydraulic pressure, a piston assembly disposed within the differential case between the pump and the clutch pack and defining a pressure chamber, and a variable pressure relief valve assembly to selectively control said limited slip assembly. The variable pressure relief valve assembly has a pressure relief valve and a solenoid actuator for selectively setting a maximum hydraulic pressure attainable within the pressure chamber between a maximum release pressure when the friction clutch pack is in the fully "ON" condition, and a minimum release pressure when the friction clutch pack is in the fully "OFF" condition. When energized, the solenoid-operated valve assembly is capable of modulating a pump discharge pressure in a variable range from a minimum pressure to a maximum pressure, thereby selectively and variably controlling a drive torque applied to the output axle shafts in a range from a minimum torque value to a maximum torque value.

Therefore, the selectively operable auxiliary drive axle coupling assembly for the AWD motor vehicles in accordance with the present invention represents a novel arrangement of the hydraulically actuated AWD coupling assembly provided with an electro-magnetic actuator for activating a variable pressure relief valve for allowing selective actuation of the auxiliary drive axle and infinitely variable torque distribution between the main and auxiliary axles of the AWD motor vehicle.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiments of the present invention will now be described with the reference to accompanying drawings.

Figure 1:
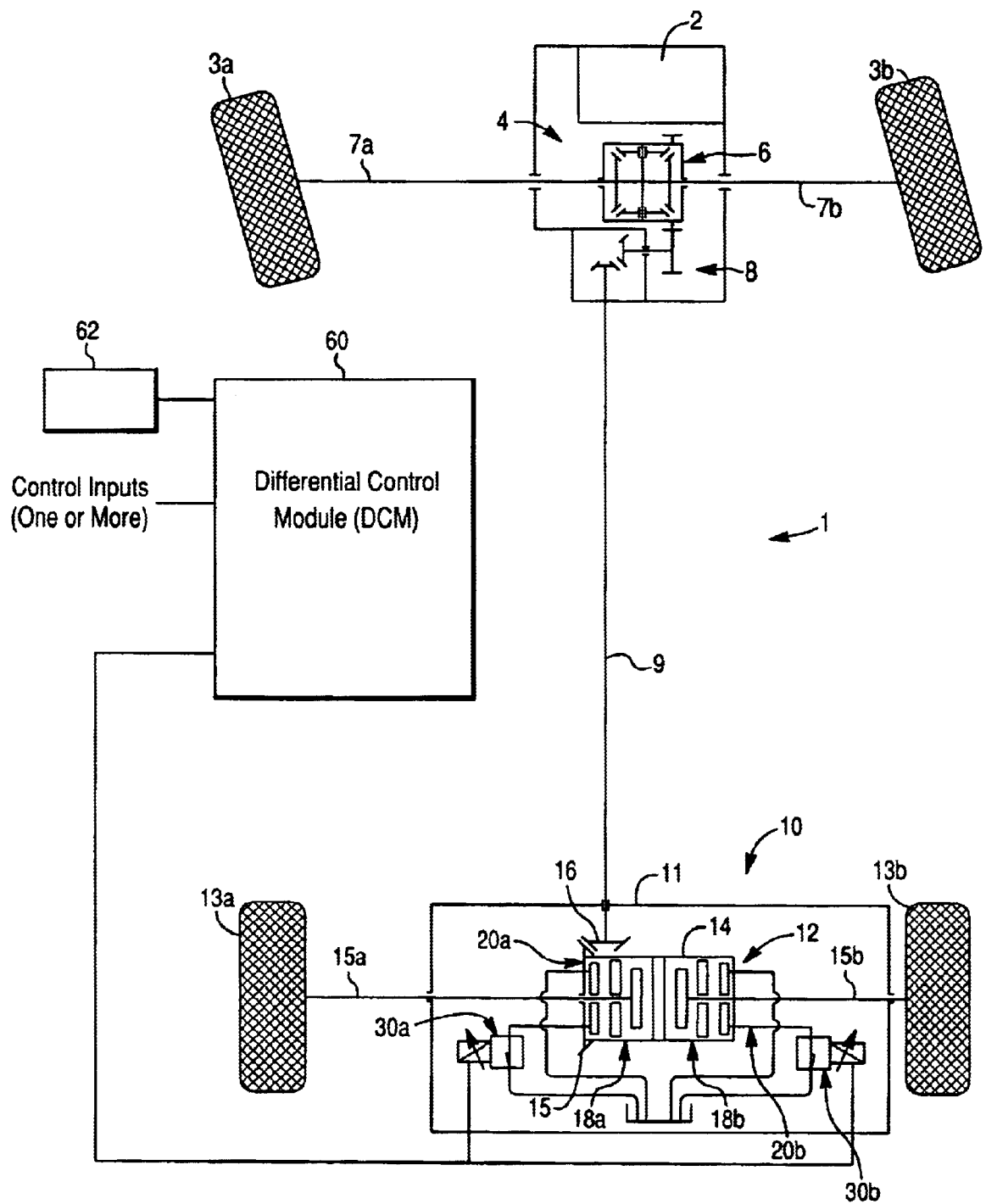
FIG. 1 is a schematic diagram showing a drivetrain of an all-wheel drive motor vehicle in accordance with the first exemplary embodiment of the present invention.

FIG. 1 schematically depicts a drivetrain 1 of an all-wheel drive motor vehicle in accordance with the first exemplary embodiment of the present invention. However, it is to be understood that while the present invention is described in relation to the all-wheel drive motor vehicle, the present invention is equally suitable for use in other hydraulically actuated friction couplings utilizing a speed sensitive hydraulic actuator.

The drivetrain 1 comprises an internal combustion engine 2 mounted to a front end of the motor vehicle and coupled to a transaxle 4, a power transfer unit 8, a propeller shaft 9 and a selectively operable rear axle assembly 10. The transaxle 4 includes a front differential 6 rotated by a drive torque from the engine 2, and two front axle shafts 7a and 7b outwardly extending from the front differential 6 and drivingly coupled to front wheels 3a and 3b, respectively.

The rear axle assembly 10 includes a selectively operable rear drive axle coupling assembly 12 disposed in an axle housing 11. The axle coupling assembly 12 includes a hollow casing 14 rotatably supported within the axle housing 11 and driven by a final drive pinion gear 16 transmitting a drive torque from the engine 2 to a ring gear 15 through the transaxle 4, the power transfer unit 8 and the propeller shaft 9. The axle coupling assembly 12 is operatively coupled to rear output axle shafts 15a and 15b outwardly extending therefrom and drivingly coupled to rear wheels 13a and 13b, respectively. The axle coupling assembly 12 further includes a limited slip device disposed within the casing 14. Preferably, the limited slip device is in the form of two opposite hydraulically actuated friction clutch assemblies 18a and 18b. The first hydraulically actuated friction clutch assembly 18a operatively connects the propeller shaft 9 and the rear output axle shaft 15a. The second hydraulically actuated friction clutch assembly 18b operatively connects the propeller shaft 9 and the rear output axle shaft 15b. Preferably, the first and second hydraulic friction clutch assemblies 18a and 18b are substantially identical, and are hydraulically actuated multi-plate clutch assemblies. In accordance with the preferred embodiment of the present invention, each of the friction clutch assemblies 18a and 18b includes a friction clutch pack 22 (shown in FIG. 2) that selectively frictionally couples the corresponding rear output axle shaft 15a or 15b to the casing 14.

Furthermore, each of the clutch assemblies 18a and 18b is selectively actuated by a corresponding hydraulic clutch actuator 20a and 20b, respectively. Preferably, the hydraulic clutch actuator 20a and 20b are substantially identical, and each includes a speed sensitive positive displacement hydraulic pump 24 providing a pressurized hydraulic fluid, a piston assembly 26 for axially loading the clutch pack 22, and a variable pressure relief valve assembly (30a and 30b) for selectively controlling a discharge pressure of the pump 24 and, subsequently, the clutch pack 22.

Preferably, the variable pressure relief valve assemblies 30a and 30b are substantially identical. Each of them is operated by an electro-magnetic (preferably, solenoid) actuator electronically controlled by a coupling control module (CCM) 60 based on one or more vehicle parameters as control inputs, such as a vehicle speed, a wheel speed difference, vehicle yaw rate, a vehicle lateral acceleration, a steering angle, an engine throttle position, a brake application, an ice detection, a moisture detection, a vehicle driveline configuration, a vehicle yaw stability control system and an anti-lock brake system/traction control system (ABS/TCS). The CCM 60 is also connected to a source of an electric power supply, such as an electric storage battery 62 mounted on the motor vehicle.

When energized, the solenoid-operated valve assembly 30a or 30b is capable of modulating a pump discharge pressure in a variable range from a minimum pressure to a maximum pressure, thereby selectively and variably controlling a drive torque applied the output axle shafts 15a and 15b in a range from a minimum torque value to a maximum torque value.

Figure 2:
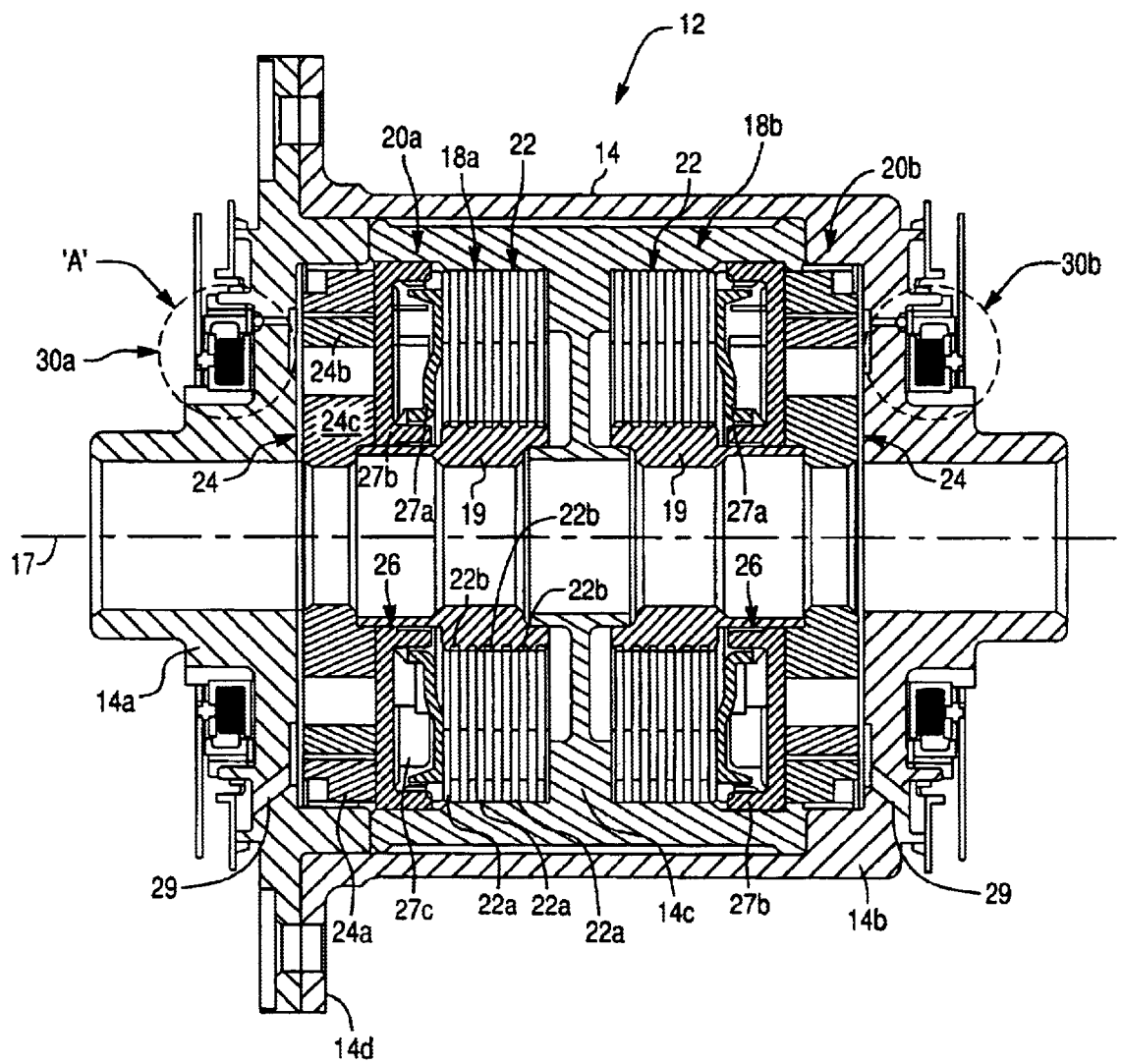
FIG. 2 is a sectional view of an auxiliary drive axle coupling assembly in accordance with the first exemplary embodiment of the present invention.

FIG. 2 of the drawings illustrates in detail the preferred arrangement of the auxiliary drive axle coupling assembly 12 in accordance with the first exemplary embodiment of the present invention. The casing 14 is rotatably supported in the axle housing 4 (shown in FIG. 1) through roller bearings (not shown), and defines an axis of rotation 17. The casing 14 is made of two half members 14a and 14b fastened to each other, preferably by means of bolts (not shown), and an inner casing separator 14c. The ring gear 15 (shown in FIG. 1) is bolted or other wise secured to the casing 14 at a flange 14d thereof.

The friction clutch packs 22 of the limited slip device are provided within the casing 14 on the both sides of the inner casing separator 14c. Each friction clutch pack 22, well known in the prior art, includes sets of alternating outer friction plates 22a and inner friction plates 22b. Conventionally, an outer circumference of the outer friction plates 22a is provided with projections that non-rotatably engages corresponding grooves formed in the casing 14. Similarly, an inner circumference of the inner friction plates 22b is provided with projections that non-rotatably engage corresponding grooves formed in an inner clutch sleeve 19, which in turn is splined to the associated axle shaft 15a or 15b. At the same time, both the outer friction plates 22a and the inner friction plates 22b are slideable in the axial direction. The clutch plates 22a frictionally engage the clutch plates 22b to form a torque coupling arrangement between the casing 14 and one of the axle shafts 15a or 15b.

The speed sensitive hydraulic displacement pump 24 disposed within the casing 14 actuates the clutch pack 22 when the relative rotation between the output axle shafts 15a and 15b occurs. It will be appreciated that a hydraulic pressure generated by the pump 24 is substantially proportional to a rotational speed difference between the output axle shafts (15a and 15b) and the casing 14. Preferably, the hydraulic displacement pump 24 employed to provide pressurized hydraulic fluid to actuate the clutch pack 20 is a bi-directional gerotor pump. The gerotor pump 24 includes an outer ring member 24a, an outer rotor 24b, and an inner rotor 24c. The inner rotor 24c drivingly coupled (i.e., keyed or splined) to the output axle shaft (15a or 15b), and the outer ring member 24a is secured (i.e., keyed or splined) to the casing 14. The inner rotor 24c has a plurality of external teeth that rotate concentrically relative to the output axle shaft (15a or 15b) about a common rotational axis. The outer rotor 24b includes a plurality of internal teeth and has an outer circumferential edge surface that is journally rotatably supported within a circular internal bore formed in the outer ring member 24a. Preferably, the inner rotor 24c has one less tooth than the outer rotor 24b and when relative rotation between the inner rotor 24c and the outer ring member 24a occurs, it causes eccentric rotation of the outer rotor 24b, which can freely rotate within the outer ring member 24a eccentrically with respect to the inner rotor 24c, thus providing a series of decreasing and increasing volume fluid pockets by means of which fluid pressure is created. Therefore, when relative motion takes place between the casing 14 and the output axle shaft (15a or 15b), the inner rotor 24c of the gerotor pump 24 generates hydraulic fluid pressure. However, it will be appreciated that any other appropriate type of hydraulic pump generating the hydraulic pressure in response to the relative rotation between the casing 14 and the output axle shaft (15a or 15b) is within the scope of the present invention.

The piston assembly 26 including a hydraulically actuated piston 27a disposed within a piston housing 27b, serves to compress the clutch pack 22 and retard any speed differential between the axle shaft 15a or 15b and the casing 14, or any speed differential between the axle shafts 15a and 15b. Pressurized hydraulic fluid to actuate the piston 27a and engage the clutch pack 22 is provided by the gerotor pump 24. In such an arrangement, when a speed difference between the output shafts 15a, 15b exists, the hydraulic fluid is drawn into the pump 24 through a suction passage 29. The gerotor pump 24 pumps the pressurized fluid into a piston pressure chamber 27c defined between the piston 27a and the piston housing 27b to actuate the clutch pack 22. As the speed difference increases, the pressure increases. The pressurized fluid in the piston pressure chamber 27c creates an axial force upon the piston 27a for applying a compressive clutch engagement force on the clutch pack 22, thereby transferring drive torque from the casing 14 to one of the axle shafts 15a and 15b. The amount of torque transfer (i.e., the torque ratio or split) is progressive and continuously variable and is proportional to the magnitude of the clutch engagement force exerted by piston 27a on the clutch pack 22 which, in turn, is a function of the fluid pressure within the piston chamber 27c. Moreover, the magnitude of the fluid pressure within piston chamber 27c, as delivered thereto by the hydraulic pump 24, is largely a function of the speed differential between the axle shafts 15a and 15b and/or between one of the axle shafts 15a and 15b and the casing 14.

As noted above, in order to control the fluid pressure within the piston pressure chamber 27c and, subsequently, the output torque distribution of the rear axle coupling assembly 12, each of the friction clutch assemblies 18a and 18b is provided with the variable pressure relief valve assembly 30a and 30b, respectively. Each of the variable pressure relief valve assemblies 30a and 30b according to the present invention (the valve assembly 30a is illustrated in detail in FIG. 3) is in the form of an electro-magnetic valve assembly and comprises a pressure relief check valve 32 controlled by an electro-magnetic actuator 34 that may be any appropriate electro-magnetic device well known in the art, such as solenoid.

The check valve 32 comprises a fluid relief passageway 36 that is in fluid communication with the piston pressure chamber 27c, a substantially conical valve seat 38 that is in open communication with the passageway 36, and a spherical valve closure member 40 adapted to seat in the valve seat 38 for sealing the fluid relief passageway 36. It will be appreciated that the valve closure member 40 may be in any appropriate form other than spherical, such as conical. The valve seat 38 is formed in the half member 14a of the casing 14. The valve closure member 40 is movable between a closed position when the valve closure member 40 engages the valve seat 38 (as shown in FIG. 3), and an open position when the valve closure member 40 is axially spaced from the valve seat 38.

The electro-magnetic actuator 34 comprises a substantially annular coil housing 42, a coil winding 44 wound about the coil housing 42, and a substantially annular armature 52 axially movable in the direction of the axis 17. The armature 52 is coaxial to the coil winding 44 and is radially spaced from the coil housing 42, thus defining an air gap 56. The coil housing 42 is supported by the casing 14 substantially coaxially to the axis 17 through a coil housing bushing 50 for rotation relative to the casing 14. At the same time, the coil housing 42 is non-rotatable relative to an axle housing (not shown). The coil housing 42 is preferably formed of a single or a plurality of laminations of a magnetically permeable material, such as conventional ferromagnetic materials. The coil housing bushing 50 is made of any appropriate non-magnetic material well known to those skilled in the art. In order to non-rotatably secure the coil housing 42 to the axle housing (not shown), an anti-rotation pin 46 is employed for non-rotatably coupling the coil housing 42 to an anti-rotation plate 48 fixed to the axle housing (not shown). Alternatively, the coil housing 42 may be non-rotatably mounted to the casing 14.

The annular armature 52 is supported within an armature bushing 54 for axially movement in the direction of the axis 17. The armature bushing 54 is non-rotatably mounted to the casing 14 by any appropriate means, such as press-fitting, adhesive bonding, etc. Preferably, the armature bushing 54 is made of any appropriate non-magnetic material well known to those skilled in the art.

Figure 3:
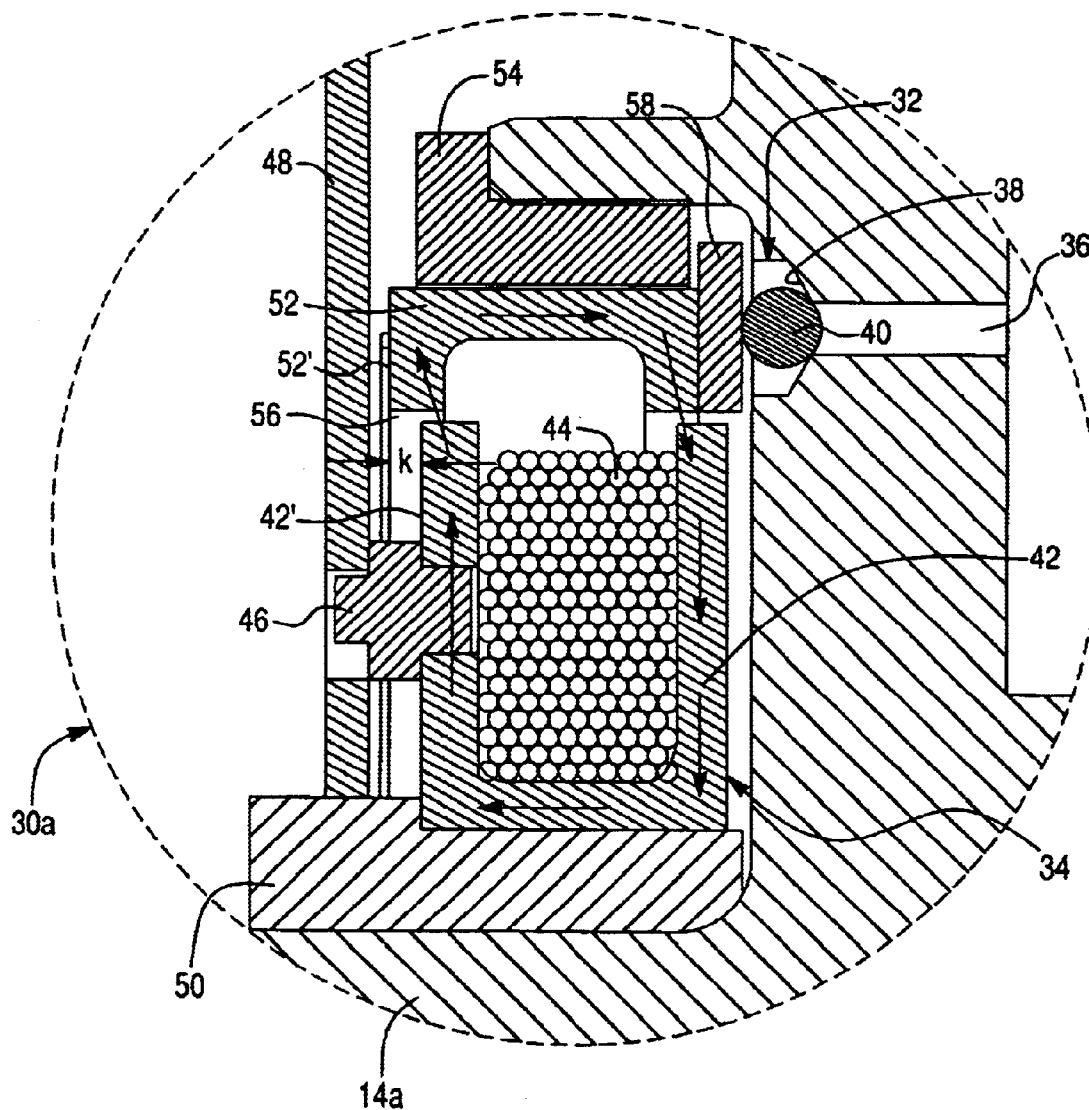
FIG. 3 is an enlarged partial sectional view of a variable pressure relief valve assembly shown in a circle 'A' in FIG. 2.

In the exemplary embodiment illustrated in FIGS. 2 and 3, the armature 52 is radially disposed outside the coil housing 42 of the electro-magnetic actuator 34. Alternatively, the armature 52 may be disposed within the coil housing 42.

The valve closure member 40 is urged and held in place by against the valve seat 38 by an actuator plate 58. In turn, the actuator plate 58 is adapted to engage the armature 52 of the electro-magnetic actuator 34 radially disposed outside the coil housing 42 thereof. Preferably, the actuator plate 58 is in the shape of an annular segment and is made of any appropriate non-magnetic material well known to those skilled in the art. Furthermore, the actuator plate 58 is fastened to the armature 52 by any appropriate means known in the art, such as threaded connectors, adhesive bonding, etc.

When electrical current is supplied to the coil winding 44, a magnetic flux is caused to flow through the armature 52. The magnetic flux creates an axial force that axially displaces the armature 52 relative to the coil housing 42. The armature 52 moves the actuator plate 58, which, in turn, urges the valve member 40 upon the valve seat 38 with a predetermined axial retaining force that is a function of the electrical current supplied to the coil winding 44. It will be appreciated by those skilled in the art that the pressurized hydraulic fluid will not flow through the pressure relief valve 32 until the hydraulic pressure generated by the gerotor pump 24 results in a reaction force larger than the axial retaining force exerted to the armature 52 by the magnetic flux generated by the coil winding 44, thereby pushing the valve closure member 40 out of the valve seat 38. Therefore, such an arrangement creates a relief valve with a release pressure that is a function of the current supplied to the coil winding 44, and provides a predetermined pressure limit in the hydraulic system. Thus, the variable pressure relief valve assembly 30a selectively sets the release pressure of the pressure relief valve 32 as a function of the electrical current supplied to the coil winding 44 and, subsequently, defines the magnitude of the pressure within the piston pressure chamber 27c.

It will be appreciated by those skilled in the art that the armature 52 may have any appropriate shape in the cross-section. Preferably, as illustrated in the exemplary embodiment of FIG. 3, the armature 52 has a generally U-shaped cross-section with magnetic poles facing the coil housing 42, similar to those used in reluctance electric motors. Moreover, the mutual geometric arrangement of the armature 52 and the coil housing 42 is such as to maintain a substantially constant axial force applied upon the valve closure member 40 by the electro-magnetic actuator 34 as it moves from its closed to open position. This is achieved by maintaining a proper "off-set" between the armature 52 and the coil housing 42 (and, consequently, the coil winding 44). The term "off-set" is determined here as an amount of misalignment between the armature 52 and the coil housing 42, or a distance k between an outward face 42' of the coil housing 42 and an outward face 52' of the armature 52, as illustrated in FIG. 3.

Figure 4:
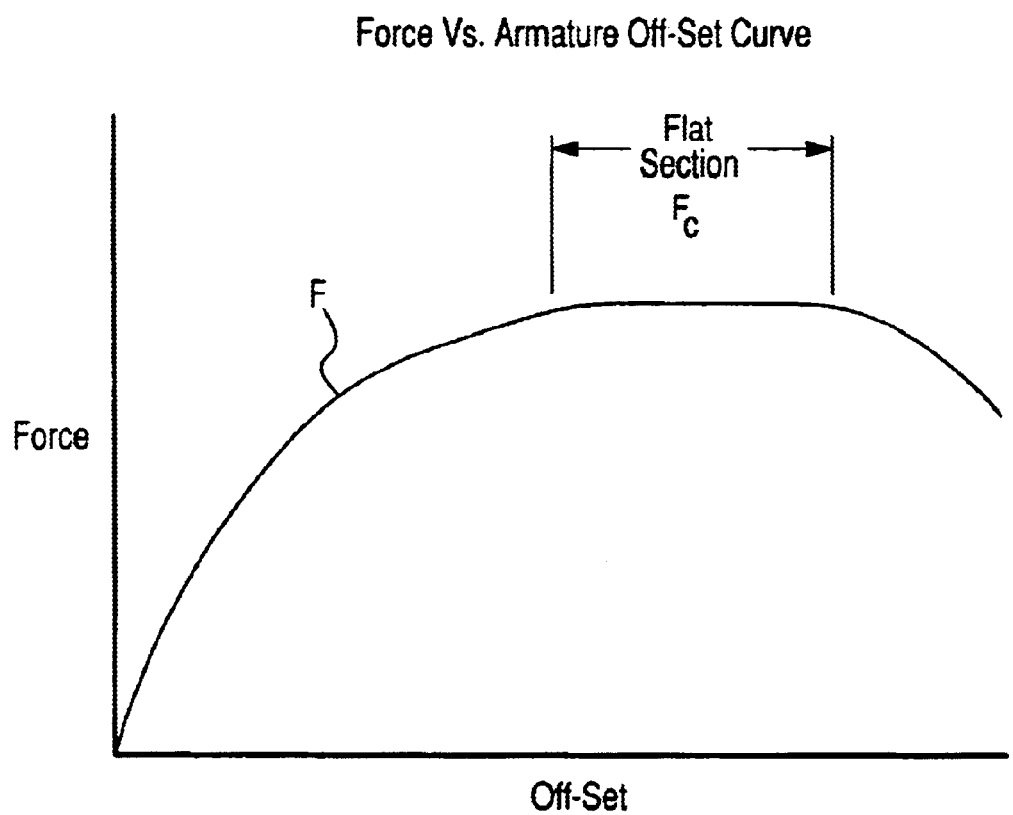
FIG. 4 is a graph showing an axial force applied upon a valve closure member by an electro-magnetic actuator as a function of "off-set" between a coil housing and an armature.

FIG. 4 depicts a graph showing the axial force applied upon the valve closure member 40 by the electro-magnetic actuator 34 as a function of the "off-set" distance k while a constant magnitude of electric current is supplied to the coil winding 44. The graph is in the form of a curved line F having a substantially "flat" section $F_C$ wherein the axial force varies insignificantly with respect to the "off-set" distance k. However, operation outside of this section $F_C$ results in an abrupt change of the axial force. Thus, while the electro-magnetic actuator 34 of the relief valve assembly (30a or 30b) is operated in the "flat" section $F_C$, the axial force applied upon the valve closure member 40 by the electro-magnetic actuator 34 is substantially constant as it moves from its closed to open position, and is a function of the electrical current supplied to the coil winding 44. On the other hand, operation outside of this "flat" section $F_C$ results in the axial force being a function of both the current and the "off-set" distance k that would make control of the variable pressure relief valve more difficult requiring a closed loop feedback as to the valve's "off-set". Other, more traditional solenoid pole designs do not provide this "flat" section in the axial force versus "off-set" distance curve.

For the above described reason, the electro-magnetic actuator 34 in accordance with the preferred embodiment of the present invention is arranged to provide the "off-set" distance k between the coil housing 42 and the armature 52 within the "flat" section $F_C$ of the axial force versus "off-set" distance curve so as to ensure that the axial force applied upon the valve closure member 40 by the electro-magnetic actuator 34 is substantially constant as it moves from its closed to open position, and is a function only of the electrical current supplied to the coil winding 44.

When a maximum current is applied to the coil winding 44 of the solenoid actuator 34, the retaining force of the pressure relief valve 32 is at its maximum, thus a maximum release pressure is provided by the pressure relief check valve 32. In this configuration, the maximum pressure attainable within the piston pressure chamber 27c is sufficient to fully actuate the hydraulic clutch pack 22 which results in fully engaging the friction clutch pack of the coupling assembly 12, and the limited slip feature is in the fully "ON" condition.

The pressure limit of the pressure relief valve 32, i.e. the release pressure of the pressure relief valve 32, can be adjusted by controlling the current applied to the coil winding 44 of the electro-magnetic actuator 34.

As the less current is applied to the coil winding 44, the less axial retaining force is exerted to the relief valve 32, thus the less is the release pressure provided by the relief valve 32. This results in an adjustment mechanism for lowering the maximum system pressure attainable within the piston pressure chamber 27c.

When a minimum current is applied to the coil winding 44 of the solenoid actuator 34, the retaining force of the pressure relief valve 32 is at its minimum, thus a minimum release pressure is provided by the relief valve 32. In this configuration, the limited slip feature is in the fully "OFF" condition in that the maximum pressure which can be obtained in the piston pressure chamber 27c is not high enough to engage the clutch pack 22, thus effectively disabling the clutch pack 22 and essentially disconnecting the coupling assembly 12.

In between the "ON" and "OFF" conditions of the coupling assembly 12, the release pressure of the relief valve 32 may be set at any value between these limits by modulating the current applied to the coil winding 44 of the solenoid actuator 34. This provides the coupling assembly 12 with an infinitely variable maximum pressure limit in which the amount of the limited slip available to the coupling assembly 12 can be limited and optimized to match various vehicle operating conditions. This provides an opportunity to dynamically control the hydraulic pressure for traction enhancement. For example, if the release pressure is set at a low value, a control system can be used to sense wheel speeds or speed differences and allow for increased hydraulic pressure. The increase in pressure available may be a function of the speed difference. This will result in an optimized amount of limited slip between the fully "ON" and "OFF" conditions.

During normal operation, the coupling assembly 12 is in the "OFF" position as the minimum current is applied to the variable pressure relief valve assembly 30a, thus disabling the clutch pack 22. Also during normal operation with straight ahead driving, the casing 14 and the axle shafts 15a and 15b rotate in unison. However, during a cornering maneuver, the axle shafts 15a and 15b have a rotational speed differing from the speed of the casing 14; but the hydraulic pumps 24 cannot deliver pressurized fluid to the pistons 27a because the minimum release pressure is provided by the relief valve 32. This prevents the AWD from operating during normal cornering.

If the front wheels lose traction, the CCM 60 issues a signal to the variable pressure relief valve assemblies 30a and 30b to set the coupling assembly 12 in the "ON" position. This will set the maximum release pressure provided by the relief valves 32. The differential speed between the casing 14 and the axles 15a, 15b will result in the hydraulic pumps 24 delivering pressurized fluid to the pistons 27a, and the clutch packs 22 will be engaged. With the clutch packs 22 engaged, the rear wheels 13a and 13b of the vehicle will be driven.

With the present invention, the AWD system is actuated when the vehicle input sensors sense a reduction in traction at the front wheels 3a and 3b. Also, the AWD system may by actuated manually by a vehicle operator.

During a cornering maneuver with the AWD system actuated, the CCM 60 issues diverse signals to the variable pressure relief valve assemblies 30a and 30b to dissimilarly modulate the loading of the clutch assemblies 18a and 18b in a variable range between the minimum pressure to the maximum pressure, thereby selectively and variably controlling the drive torque applied the output axle shafts 15a and 15b in a range from a minimum torque value to a maximum torque value. This allows the coupling assembly 12 to function as a differential assembly that automatically limits slip and appropriately distributes torque between the wheels 13a and 13b of the auxiliary axle assembly 10. The coupling assembly 12 also can respond appropriately to a speed differential caused by a deflated or spare tire.

Figure 5:
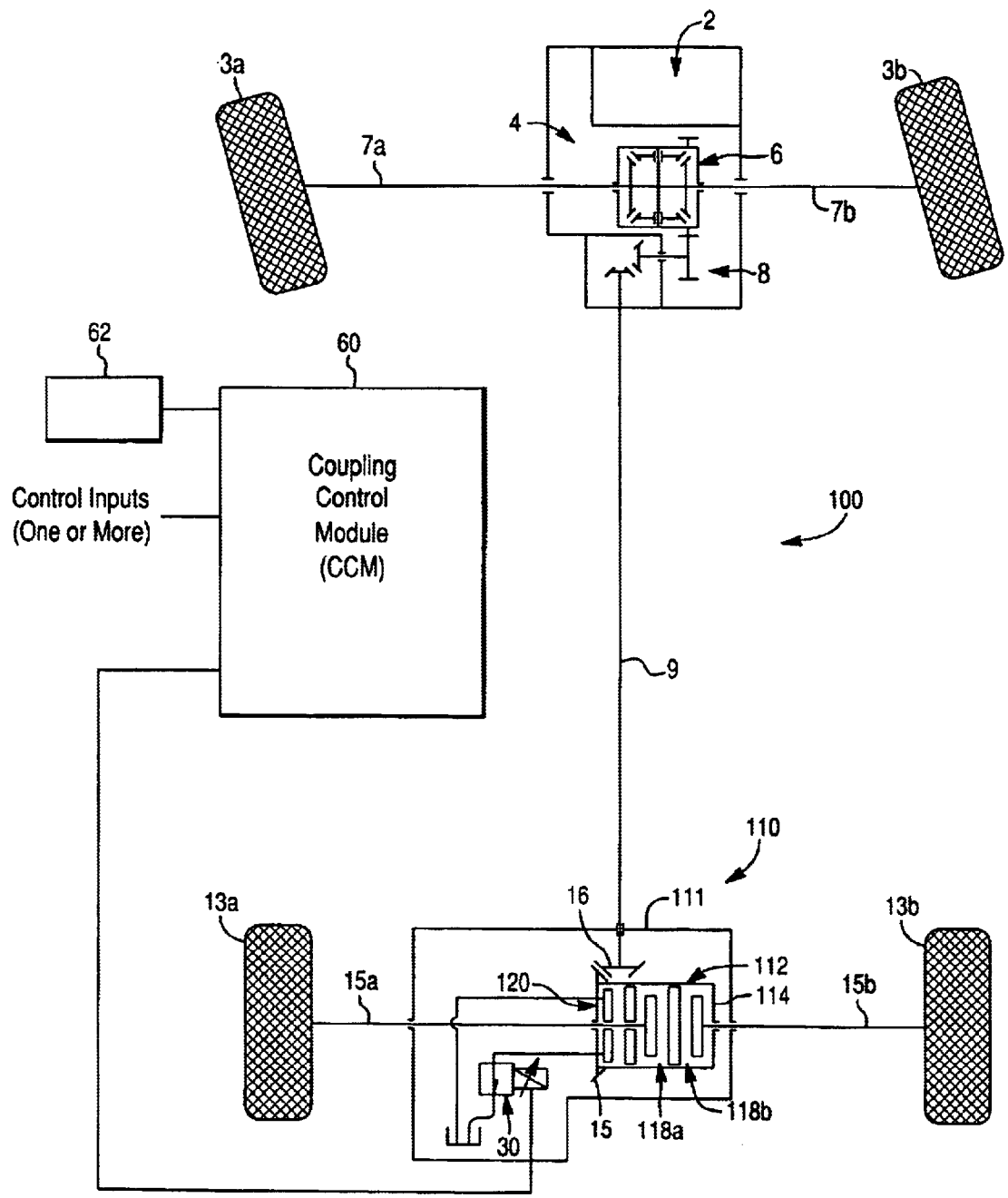
FIG. 5 is a schematic diagram showing a drivetrain of an all-wheel drive motor vehicle in accordance with the second exemplary embodiment of the present invention.
Figure 6:
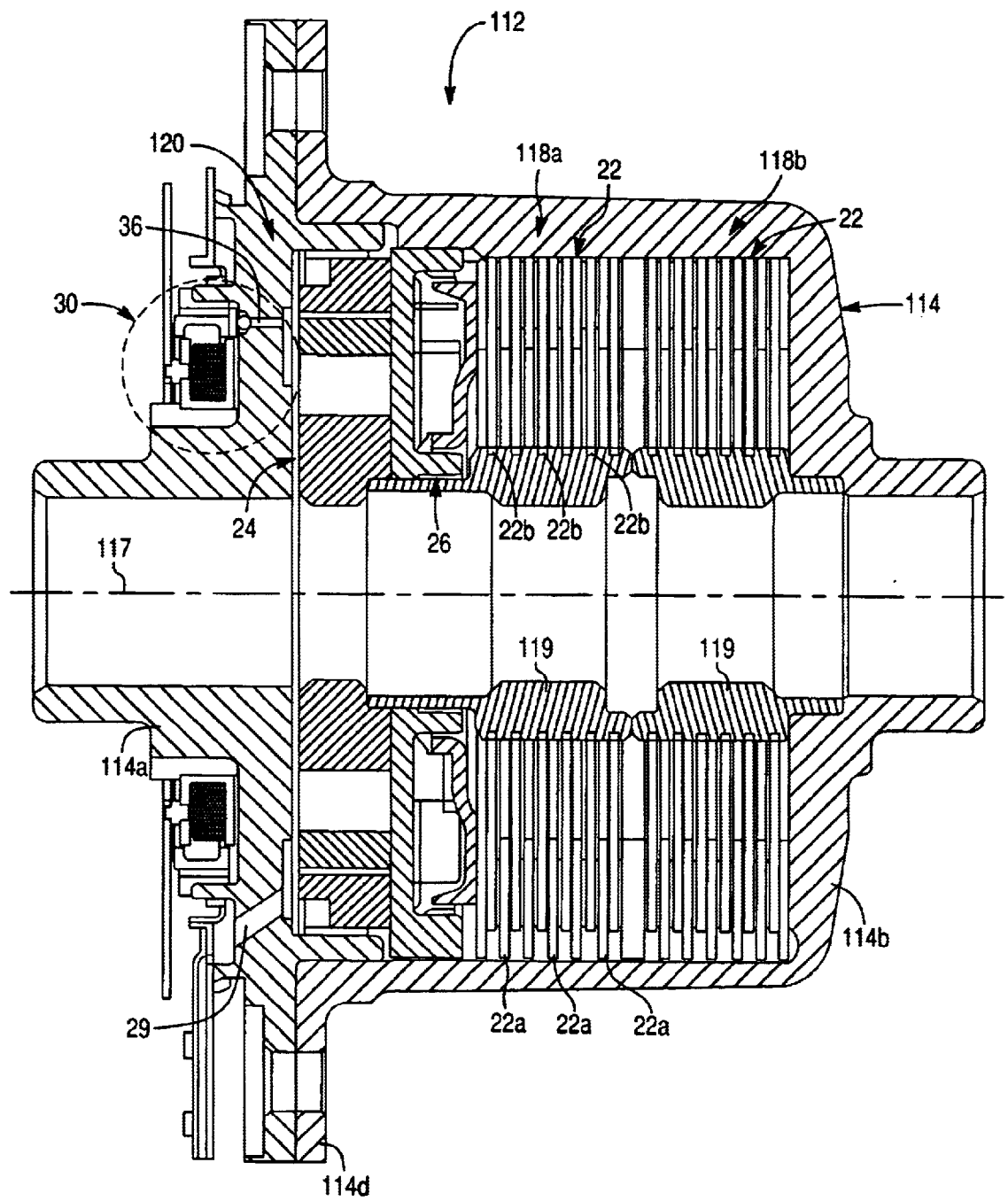
FIG. 6 is a sectional view of an auxiliary drive axle coupling assembly in accordance with the second exemplary embodiment of the present invention.

FIGS. 5 and 6 of the drawings depict the second exemplary embodiment of the present invention. Components, which are unchanged from, or function in the same way as in the first exemplary embodiment depicted in FIGS. 1–4 are labeled with the same reference numerals, sometimes without describing detail since similarities between the corresponding parts in the two embodiments will be readily perceived by the reader.

FIG. 5 schematically depicts a drivetrain 100 of an all-wheel drive motor vehicle in accordance with the second exemplary embodiment of the present invention. The drivetrain 100 comprises an internal combustion engine 2 mounted to a front end of the motor vehicle and coupled to a transaxle 4, a power transfer unit 8, a propeller shaft 9 and a selectively operable auxiliary axle assembly 110. The transaxle 4 includes a front differential 6 rotated by a drive torque from the engine 2, and two front axle shafts 7a and 7b outwardly extending from the front differential 6 and drivingly coupled to front wheels 3a and 3b, respectively.

The auxiliary axle assembly 110 includes a selectively operable auxiliary drive axle coupling assembly 112 disposed in an axle housing 111. The axle coupling assembly 112 includes a hollow casing 114 rotatably supported within the axle housing 111 and driven by a final drive pinion gear 16 transmitting a drive torque from the engine 2 to a ring gear 15 through the transaxle 4, the power transfer unit 8 and the propeller shaft 9. The axle coupling assembly 112 is operatively coupled to rear output axle shafts 15a and 15b outwardly extending therefrom and drivingly coupled to rear wheels 13a and 13b, respectively. The axle coupling assembly 112 further includes a limited slip device disposed within the case 114. Preferably, the limited slip device is in the form of two opposite, axially spaced hydraulically actuated friction clutch assemblies: a first clutch assembly 118a and a second clutch assembly 118b. The first hydraulically actuated friction clutch assembly 118a operatively connects the propeller shaft 9 and the rear output axle shaft 15a. The second hydraulically actuated friction clutch assembly 118b operatively connects the propeller shaft 9 and the rear output axle shaft 15b.

FIG. 6 of the drawings illustrates in detail the preferred arrangement of the auxiliary drive axle coupling assembly 112 in accordance with the second exemplary embodiment of the present invention. The casing 114 is rotatably supported in the axle housing 111 (shown in FIG. 5) through roller bearings (not shown), and defines an axis of rotation 117. The casing 114 is made of two half members 114a and 114b fastened to each other, preferably by means of bolts (not shown). The ring gear 15 (shown in FIG. 5) is bolted or other wise secured to the casing 114 at a flange 114d thereof.

The friction clutch assemblies 118a and 118b include substantially identical multi-plate friction clutch packs 22 that selectively frictionally couple the corresponding rear output axle shaft 15a or 15b to the casing 114. Alternatively, the number of plates in the clutch packs 22 of the friction clutch assemblies 118a and 118b may be different, e.g. the number of plates in the clutch pack 22 of the clutch assembly 118b may be larger than the number of plates in the clutch pack 22 of the clutch assembly 118a. An axially floating reaction plate 115 is drivingly coupled (i.e. splined) to the half member 114b of the casing 114 and separates the clutch pack 22 of the friction clutch assembly 118a from the clutch pack 22 of the friction clutch assembly 118b. Each friction clutch pack 22, well known in the prior art, includes sets of alternating outer friction plates 22a and inner friction plates 22b. Conventionally, an outer circumference of the outer friction plates 22a is provided with projections that non-rotatably engages corresponding grooves formed in the casing 114. Similarly, an inner circumference of the inner friction plates 22b is provided with projections that non-rotatably engage corresponding grooves formed in the inner clutch sleeve 119, which in turn is splined to the associated axle shaft 15a or 15b. At the same time, both the outer friction plates 22a and the inner friction plates 22b are slideable in the axial direction. The clutch plates 22a frictionally engage the clutch plates 22b to form a torque coupling arrangement between the casing 114 and one of the axle shafts 15a or 15b.

The clutch assemblies 118a and 118b are selectively actuated by a single hydraulic clutch actuator 120. Preferably, the hydraulic clutch actuator 120 includes a speed sensitive hydraulic displacement pump 24 providing a pressurized hydraulic fluid, a piston assembly 26 for axially loading the clutch pack 22, and a variable pressure relief valve assembly 30 for selectively controlling a discharge pressure of the pump 24 and, subsequently, the clutch pack 22.

The variable pressure relief valve assembly 30 is constructed identically with the variable pressure relief valve assemblies 30a and 30b of the first exemplary embodiment of the present invention and, hence, the detailed description thereof is omitted.

The variable pressure relief valve assembly 30 is operated by an electro-magnetic (preferably, solenoid) actuator electronically controlled by a coupling control module (CCM) 60 based on one or more vehicle parameters as control inputs, such as a vehicle speed, a wheel speed difference, a vehicle yaw rate, a vehicle lateral acceleration, a steering angle, an engine throttle position, a brake application, an ice detection, a moisture detection, a vehicle driveline configuration, a vehicle yaw stability control system and an anti-lock brake system/traction control system (ABS/TCS). The CCM 60 is also connected to a source of an electric power supply, such as an electric storage battery 62 mounted on the motor vehicle.

When energized, the solenoid-operated valve assembly 30 is capable of modulating a pump discharge pressure in a variable range from a minimum pressure to a maximum pressure, thereby selectively and variably controlling a drive torque applied to the output axle shafts 15a and 15b in a range from a minimum torque value to a maximum torque value. Thus, the torque coupling in accordance with second exemplary embodiment of the present invention allows variable torque distribution between the main axle and the auxiliary axle, as well as the speed differential between the left and right axle shafts 15a and 15b.

Figure 7:
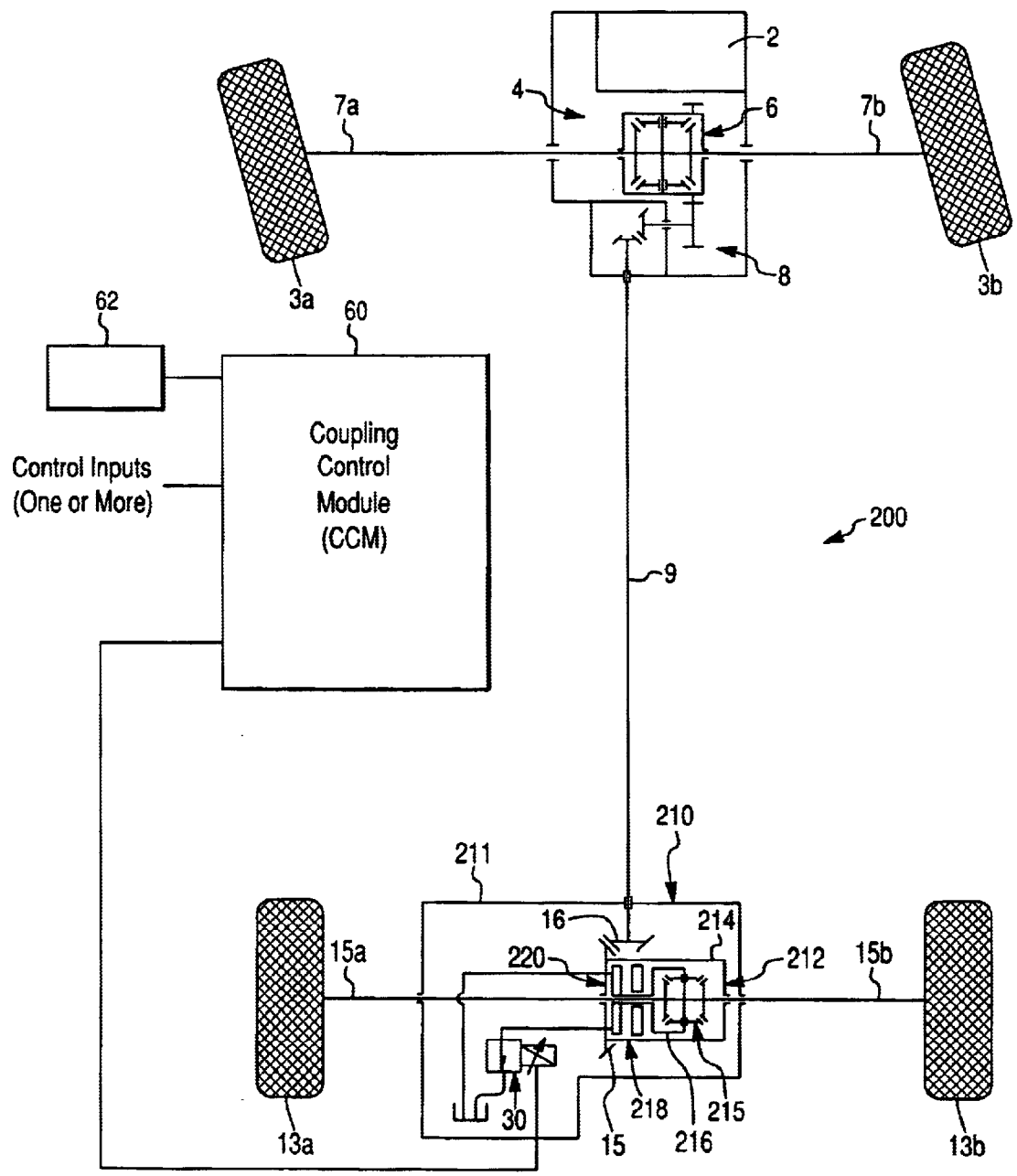
FIG. 7 is a schematic diagram showing a drivetrain of an all-wheel drive motor vehicle in accordance with the third exemplary embodiment of the present invention.
Figure 8:
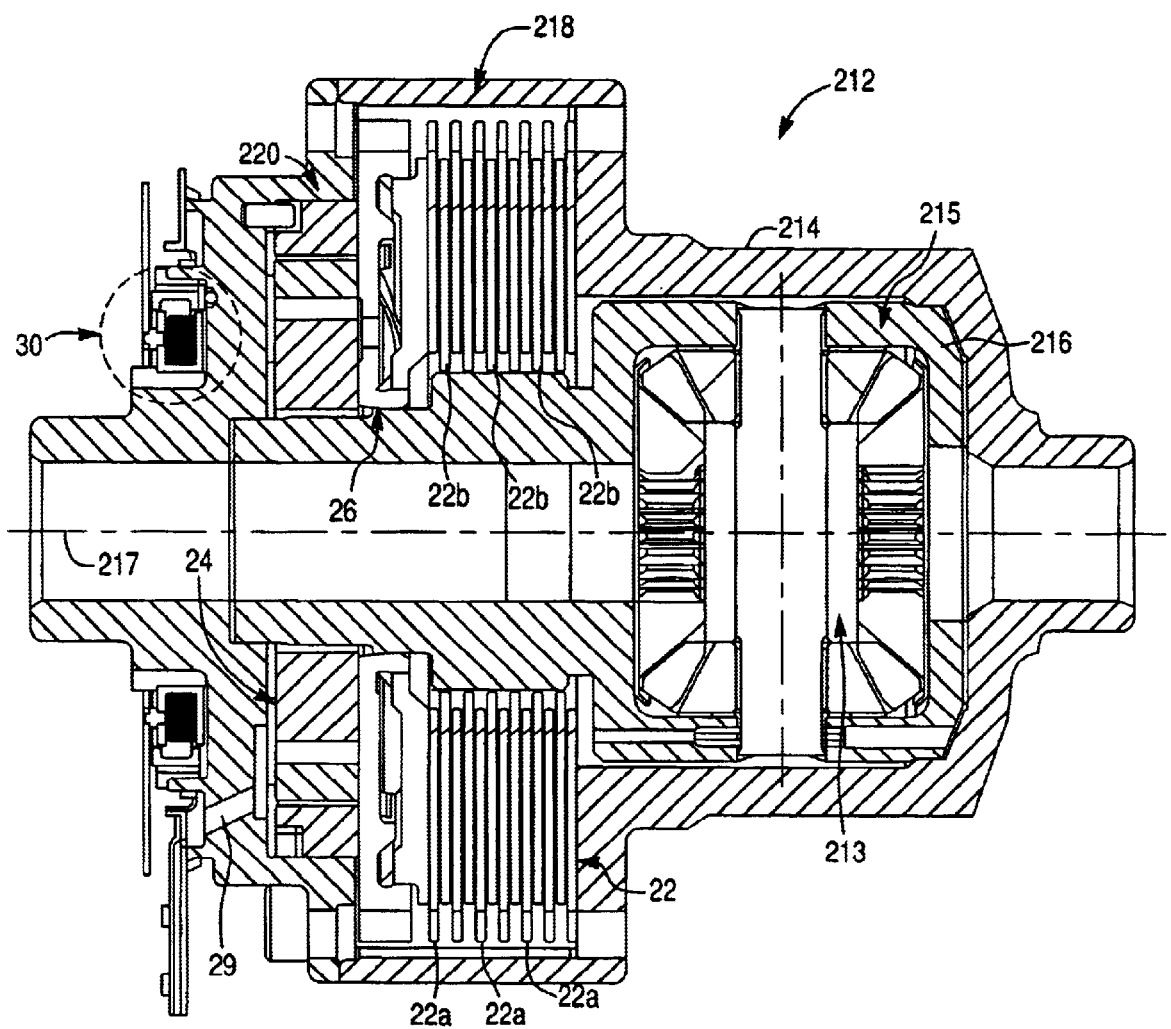
FIG. 8 is a sectional view of an auxiliary drive axle coupling assembly in accordance with the third exemplary embodiment of the present invention.

FIGS. 7 and 8 of the drawings depict the third exemplary embodiment of the present invention. Components, which are unchanged from, or function in the same way as in the first exemplary embodiment of the present invention depicted in FIGS. 1–4 or the second exemplary embodiment depicted in FIGS. 5–6, are labeled with the same reference numerals, sometimes without describing detail since similarities between the corresponding parts in the two embodiments will be readily perceived by the reader.

FIG. 7 schematically depicts a drivetrain 200 of an all-wheel drive motor vehicle in accordance with the third exemplary embodiment of the present invention. The drivetrain 200 comprises an internal combustion engine 2 mounted to a front end of the motor vehicle and coupled to a transaxle 4, a power transfer unit 8, a propeller shaft 9 and a selectively operable auxiliary drive axle assembly 210. The transaxle 4 includes a front differential 6 rotated by a drive torque from the engine 2, and two front axle shafts 7a and 7b outwardly extending from the front differential 6 and drivingly coupled to front wheels 3a and 3b, respectively.

The auxiliary drive axle assembly 210 includes a selectively operable auxiliary drive axle coupling assembly 212 disposed in an axle housing 211. The axle coupling assembly 212 includes a hollow casing 214 rotatably supported within the axle housing 211 and driven by a final drive pinion gear 16 transmitting a drive torque from the engine 2 to a ring gear 15 through the transaxle 4, the power transfer unit 8 and the propeller shaft 9. The ring gear 15 is bolted or other wise secured to the casing 214.

The axle coupling assembly 212 operatively couples the propeller shaft 9 to the rear wheels 13a and 13b through a limited slip device and a differential assembly 215 disposed within the casing 214. Preferably, the limited slip device is in the form of a hydraulically actuated friction clutch assembly 218 selectively connecting the casing 214 to the differential assembly 215.

FIG. 8 of the drawings illustrates in detail the preferred arrangement of the auxiliary drive axle coupling assembly 212 in accordance with the third exemplary embodiment of the present invention. The casing 214 is rotatably supported in the axle housing 211 (shown in FIG. 7) through roller bearings (not shown), and defines an axis of rotation 217. The differential assembly 215 includes a differential gear mechanism 213 disposed inside a differential case 216.

The friction clutch assembly 218 includes a multi-plate friction clutch pack 22 that selectively frictionally couples the differential case 216 to the casing 214. The friction clutch pack 22, well known in the prior art, includes sets of alternating outer friction plates 22a and inner friction plates 22b. Conventionally, an outer circumference of the outer friction plates 22a is provided with projections that non-rotatably engages corresponding grooves formed in the casing 214. Similarly, an inner circumference of the inner friction plates 22b is provided with projections that non-rotatably engage corresponding grooves formed in the differential case 216. At the same time, both the outer friction plates 22a and the inner friction plates 22b are slideable in the axial direction. The clutch plates 22a frictionally engage the clutch plates 22b to form a torque coupling arrangement between the casing 214 and the differential case 216.

A single hydraulic clutch actuator 220 selectively actuates the friction clutch pack 22. Preferably, the hydraulic clutch actuator 220 includes a speed sensitive hydraulic displacement pump 24 providing a pressurized hydraulic fluid, a piston assembly 26 for axially loading the clutch pack 22, and a variable pressure relief valve assembly 30 for selectively controlling a discharge pressure of the pump 24 and, subsequently, the clutch pack 22.

The hydraulic displacement pump 24 providing a pressurized hydraulic fluid, the piston assembly 26 and the variable pressure relief valve assembly 30 are constructed identically with the hydraulic pump, the piston assembly and the variable pressure relief valve assemblies 30a and 30b of the first exemplary embodiment of the present invention and, hence, the detailed description thereof is omitted.

The variable pressure relief valve assembly 30 is operated by an electro-magnetic (preferably, solenoid) actuator electronically controlled by a coupling control module (CCM) 60 based on one or more vehicle parameters as control inputs, such as a vehicle speed, a wheel speed difference, a vehicle yaw rate, a vehicle lateral acceleration, a steering angle, an engine throttle position, a brake application, an ice detection, a moisture detection, a vehicle driveline configuration, a vehicle yaw stability control system and an anti-lock brake system/traction control system (ABS/TCS). The CCM 60 is also connected to a source of an electric power supply, such as the electric storage battery 62 mounted on the motor vehicle.

When energized, the solenoid-operated valve assembly 30 is capable of modulating a pump discharge pressure in a variable range from a minimum pressure to a maximum pressure, thereby selectively and variably controlling a drive torque applied to the output axle shafts 15a and 15b in a range from a minimum torque value to a maximum torque value. Thus, the torque coupling in accordance with third exemplary embodiment of the present invention allows infinitely variable torque distribution between the main axle and the auxiliary axle.

Therefore, the selectively operable auxiliary drive axle coupling assembly for the AWD motor vehicles in accordance with the present invention represents a novel arrangement of the hydraulically actuated AWD coupling assembly provided with an electro-magnetic actuator for activating a variable pressure relief valve for allowing selective actuation of the auxiliary drive axle and infinitely variable torque distribution between the main and auxiliary axles of the AWD motor vehicle.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A hydraulic coupling assembly for an auxiliary drive axle of an all wheel drive motor vehicle, said hydraulic coupling assembly comprising:
    a hollow casing to be rotated by an outside drive torque;
    a first output shaft and a second output shaft axially outwardly extending from said casing;
    at least one hydraulically operated selectively engageable friction clutch assembly for operatively coupling said casing and at least one of said first and second output shafts;
    at least one hydraulic clutch actuator for selectively frictionally loading said at least one friction clutch assembly, said actuator comprising:
        a hydraulic pump located within said casing to generate a hydraulic pressure to frictionally load said at least one friction clutch assembly; and
        a variable pressure relief valve assembly fluidly communicating with said hydraulic pump to selectively control said hydraulic pressure, wherein said variable pressure relief valve assembly includes a valve closure member, a valve seat complementary to said valve closure member and an electro-magnetic actuator for engaging said valve closure member and generating a variable electro-magnetic force urging said valve closure member against said valve seat so as to selectively vary a release pressure of said pressure relief valve assembly based on a magnitude of an electric current supplied to said electro-magnetic actuator, said valve closure member is movable between a closed position when said valve closure member engages said valve seat and an open position when said valve closure member is axially spaced from said valve seat.

2. The hydraulic coupling assembly as defined in claim 1, wherein hydraulic coupling assembly including:
    a first hydraulically operated selectively engageable friction clutch assembly for frictionally coupling said casing and said first output shafts;
    a second hydraulically operated selectively engageable friction clutch assembly for frictionally coupling said casing and said second output shafts;
    a first hydraulic clutch actuator for selectively frictionally loading said first friction clutch assembly; and
    a second hydraulic clutch actuator for selectively frictionally loading said second friction clutch assembly.

3. The hydraulic coupling assembly as defined in claim 1, wherein hydraulic coupling assembly including:
    a first hydraulically operated selectively engageable friction clutch assembly for frictionally coupling said casing and said first output shafts;
    a second hydraulically operated selectively engageable friction clutch assembly for frictionally coupling said casing and said second output shafts,
    wherein said hydraulic clutch actuator is provided for selectively frictionally loading both said first and second friction clutch assemblies.

4. The hydraulic coupling assembly as defined in claim 1, further including a differential assembly rotatably supported within said casing, said differential assembly including a differential case housing a differential mechanism provided for operatively connecting said first output shaft and said second output shaft and for allowing differential rotation therebetween, wherein said friction clutch assembly frictionally couples said casing and said differential case.

5. The hydraulic coupling assembly as defined in claim 1, wherein said electro-magnetic actuator including a coil winding wound about a coil housing supported by said casing and an armature radially spaced from said coil housing and axially movable relative thereto in response to a magnetic flux generated by said coil winding when said electrical current is supplied thereto, said armature engages said valve closure member and urges thereof against said valve seat with an axial force determined by said magnitude of said electric current for selectively setting up said release pressure of said valve closure member.

6. The hydraulic coupling assembly as defined in claim 5, wherein said coil winding is wound about said coil housing rotatably mounted to an outer peripheral surface of said casing coaxially to an axis of rotation of said casing.

7. The hydraulic coupling assembly as defined in claim 5, wherein said armature is non-rotatably coupled to said casing.

8. The hydraulic coupling assembly as defined in claim 5, wherein said armature is disposed outside said coil housing of said electro-magnetic actuator.

9. The hydraulic coupling assembly as defined in claim 5, wherein said armature is substantially annular in shape and is mounted substantially coaxially to said coil housing.

10. The hydraulic coupling assembly as defined in claim 5, wherein said armature has a substantially U-shaped cross-section.

11. The hydraulic coupling assembly as defined in claim 5, wherein said coil housing has a substantially U-shaped cross-section.

12. The hydraulic coupling assembly as defined in claim 5, wherein said coil housing is rotatably mounted to said casing.

13. The hydraulic coupling assembly as defined in claim 5, wherein said armature is off-set from said coil housing to a distance that ensures that said axial force applied upon said valve closure member by said electro-magnetic actuator is substantially constant as said valve closure member moves from said closed position to said open position and said axial force is a function only of said electrical current supplied to said coil winding.

14. The hydraulic coupling assembly as defined in claim 1, wherein said friction clutch assembly is a friction clutch pack including a plurality of inner friction plates coupled to rotate with said at least one output shaft and a plurality of outer friction plate coupled to rotate with said casing, said friction plates being frictionally engageable with one another.

15. The hydraulic coupling assembly as defined in claim 1, wherein said hydraulic pump is a positive displacement hydraulic pump disposed within said casing, said hydraulic pump generates a hydraulic pressure in response to relative rotation between said casing and at least one of said output shafts.

16. The hydraulic coupling assembly as defined in claim 15, wherein said pump is a bi-directional gerotor pump.

17. The hydraulic coupling assembly as defined in claim 1, wherein said variable pressure relief valve assembly is adapted to selectively set a maximum hydraulic pressure attainable within said casing between a maximum release pressure and a minimum release pressure.

18. The hydraulic coupling assembly as defined in claim 17, wherein said minimum release pressure is at a level that prevents actuation of said at least one friction clutch assembly.

19. The hydraulic coupling assembly as defined in claim 17, wherein said maximum release pressure is at a level that enables complete actuation of said at least one friction clutch assembly.

20. The hydraulic coupling assembly as defined in claim 17, wherein said maximum hydraulic pressure attainable within said casing is adjustable between said minimum release pressure and said maximum release pressure so as to enable partial actuation of said at least one friction clutch assembly.

21. The hydraulic coupling assembly as defined in claim 1, wherein said hydraulic clutch actuator further including a piston assembly disposed within said casing between said pump and said at least one clutch assembly and defining a pressure chamber, wherein said variable pressure relief valve assembly selectively controls a maximum hydraulic pressure attainable within said pressure chamber.

22. The hydraulic coupling assembly as defined in claim 21, wherein said variable pressure relief valve assembly selectively controls said maximum pressure attainable within said pressure chamber between a maximum release pressure and a minimum release pressure.

23. The hydraulic coupling assembly as defined in claim 22, wherein said minimum release pressure is at a level that prevents actuation of said at least one friction clutch assembly.

24. The hydraulic coupling assembly as defined in claim 22, wherein said maximum release pressure is at a level that enables complete actuation of said at least one friction clutch assembly.

25. The hydraulic coupling assembly as defined in claim 22, wherein said maximum hydraulic pressure attainable within said pressure chamber is adjustable between said minimum release pressure and said maximum release pressure so as to enable partial actuation of said at least one friction clutch assembly.

26. The hydraulic coupling assembly as defined in claim 1, wherein said selective control of said at least one friction clutch assembly is determined in response to at least one vehicle parameter.

27. The hydraulic coupling assembly as defined in claim 26, wherein said at least one vehicle parameter is selected from the group consisting of a vehicle speed, a wheel speed difference, a vehicle yaw rate, a steering angle, an engine throttle position, a vehicle lateral acceleration, a brake application, an ice detection, a moisture detection, a driveline configuration, an anti-lock brake system/traction control system actuation, and a vehicle yaw stability control system actuation.

* * * * *